United States Patent [19]
Atkinson

[11] 3,760,845
[45] Sept. 25, 1973

[54] HIGH-LOW PRESSURE RESPONSIVE PILOT VALVE STRUCTURE

[75] Inventor: Eulas R. Atkinson, Conroe, Tex.

[73] Assignee: ACF Industries, Incorporated, New York, N.Y.

[22] Filed: Sept. 25, 1972

[21] Appl. No.: 292,215

[52] U.S. Cl. ............................................. 137/625.66
[51] Int. Cl. ....................... F16k 11/07, F16k 31/12
[58] Field of Search ........................ 137/625.66, 458, 137/488, 492.5, 529, 538, 542, 543, 624.27, 625.17, 625.6, 637.2, 625.68, 625.69; 251/28

[56] References Cited
UNITED STATES PATENTS

| 2,667,890 | 2/1954 | Meyning | 137/458 |
| 3,026,904 | 3/1962 | Dollison | 137/458 X |
| 3,083,726 | 4/1963 | Woelfel | 137/458 |
| 3,326,239 | 6/1967 | Saint-Joanis et al. | 137/625.66 |
| 3,621,881 | 11/1971 | Vicari | 137/625.66 |

Primary Examiner—Henry T. Klinksiek
Assistant Examiner—Robert J. Miller
Attorney—Eugene N. Riddle

[57] ABSTRACT

A high-low pressure responsive pilot valve structure comprising a valve body having a valve chamber with oppositely facing valve seats thereon. A valve element on one of the valve seats is biased into seated position thereon within the operating pressure range by pressurized control fluid in contact with the valve element and thereby permitting the flow of control fluid through an outlet passage to a valve actuator or the like. Fluid responsive means engage the valve element to move the valve element to the other opposite valve seat in blocking position with respect to the flow of control fluid from the control fluid supply through the outlet passage upon either a predetermined low pressure being reached or a predetermined high pressure being reached. When the valve element is seated on the other opposite valve seat, the control fluid from the valve actuator or the like is permitted to bleed to atmosphere.

10 Claims, 8 Drawing Figures

United States Patent [19]
Atkinson
[11] 3,760,845
[45] Sept. 25, 1973
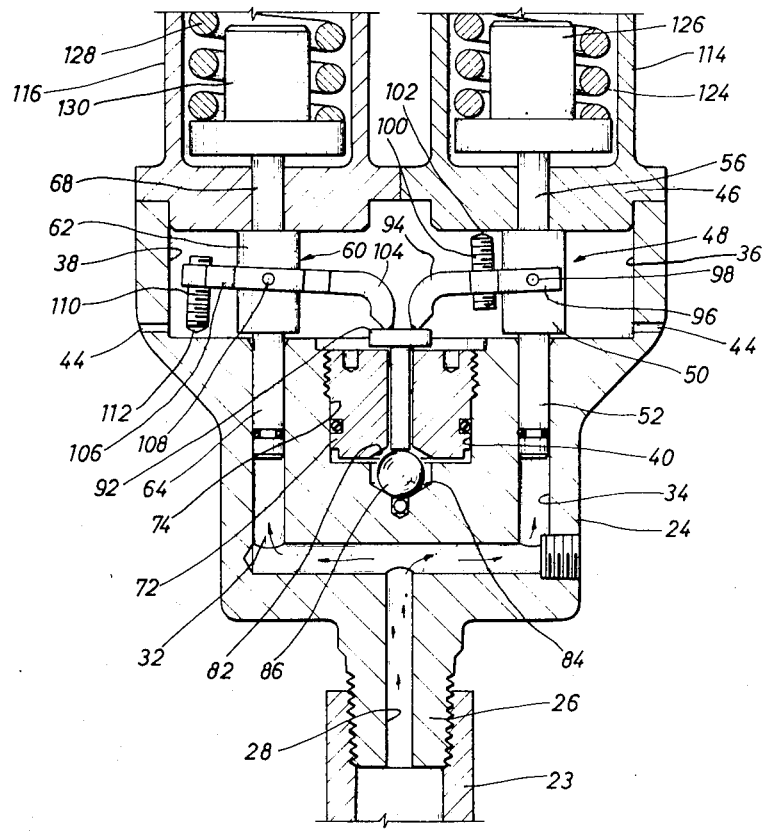

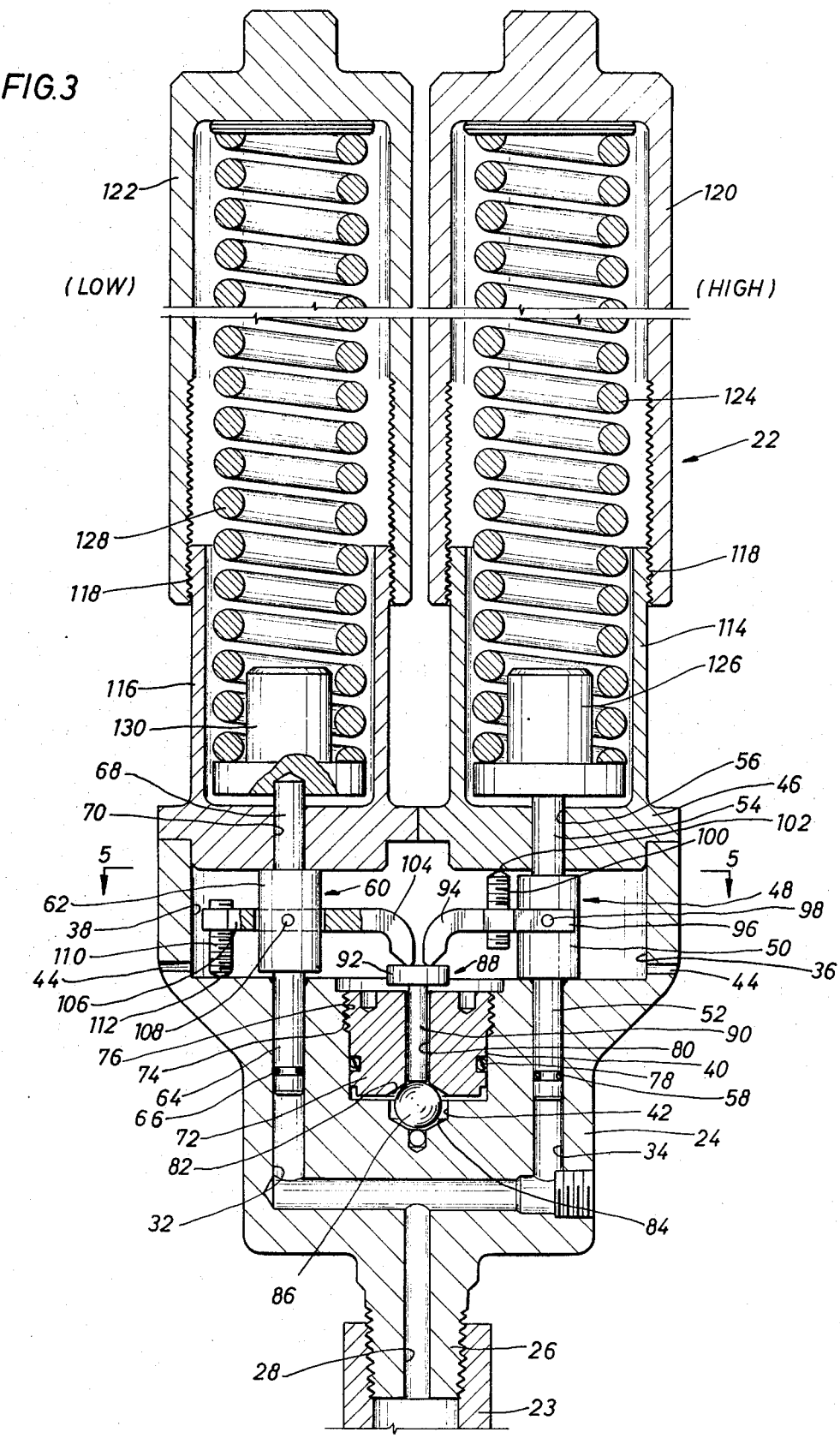

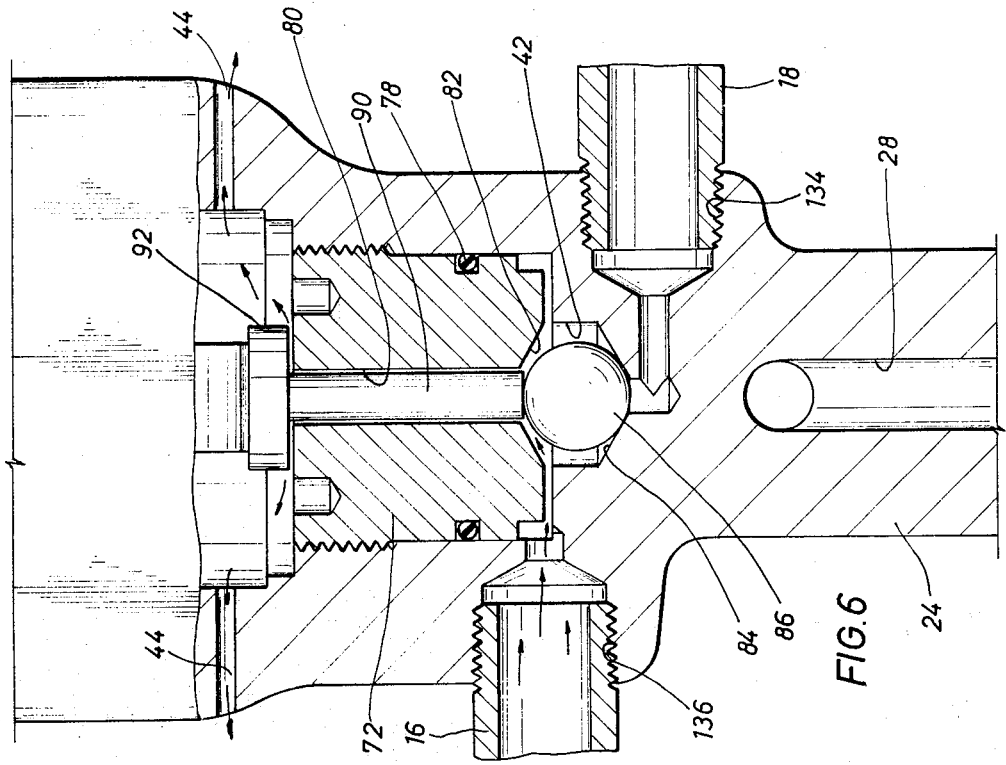
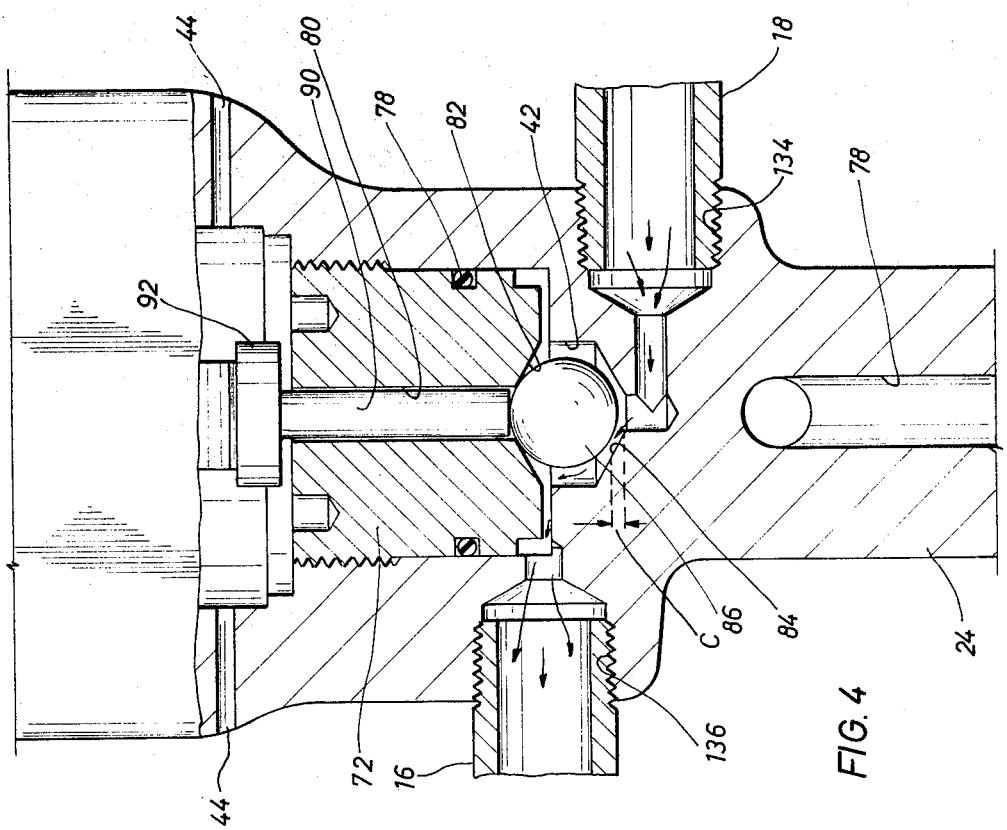

HIGH-LOW PRESSURE RESPONSIVE PILOT VALVE STRUCTURE

BACKGROUND OF THE INVENTION

A pilot valve which is adapted to be actuated either at a high pressure or a low pressure has been employed heretofore. For example, U.S. Pat. No. 3,621,881 dated Nov. 23, 1971 discloses a pilot valve structure in which a spool valve is mounted for reciprocation and blocks the flow of control fluid through the valve structure in the event the sensed fluid pressure becomes excessively high or low. A pair of compression springs provided with the spool valve shown in U.S. Pat. No. 3,621,881 are moved to a first position in the event the sensed fluid pressure is below an operating pressure range thereby to block the flow of pressurized control fluid. Both of the compression springs are overcome upon sensing of pressure above the operating pressure range thereby to block the flow of control fluid at the control fluid inlet.

Generally, pilot valve structures sense and control the supply of control fluid to actuators, such as pneumatic valve actuators and the like. When the sensed pressure is outside the operating pressure range, either below the predetermined maximum or above the predetermined minimum, the flow of control fluid to the actuator is blocked. In order to allow control of the supply control fluid, it is necessary to provide two sensing systems, one being responsive to an excessively high pressure and the other being responsive to an excessively low pressure to provide a system that will automatically block the flow of fluid to the pneumatic valve actuator when the operating or sensed fluid pressure either falls below or exceeds an operating pressure range. The combined high-pressure and low-pressure pilot valves have generally been relatively complicated such as the aforementioned pilot valve structure shown in U.S. Pat. No. 3,621,881.

DESCRIPTION OF THE PRESENT INVENTION

The present invention includes a pilot valve structure which senses flowline pressures and controls the supply of the control fluid to an actuator, such as a pneumatic valve actuator. When the sensed fluid pressure is below either a predetermined maximum or above a predetermined minimum, the flow of control fluid to the actuator will be blocked and control fluid from the actuator is exhausted to atmosphere. The pilot valve structure comprises a valve body having a valve chamber with opposed valve seats therein, a freely floating ball element in said valve chamber movable between the opposed valve seats and adapted to seat thereon in fluid sealing relation, the valve body having control fluid inlet and outlet means with the control fluid being exposed to the ball valve and biasing the ball element to a seated position on one opposed valve seat to permit flow of control fluid to the outlet, means responsive to a predetermined low pressure and separate means responsive to a predetermined high pressure move the ball valve from one valve seat to the other opposed seat upon reaching the low or high pressure whereby upon seating on the other opposed seat the control fluid will be blocked to the outlet to permit the control fluid to be exhausted from the outlet or actuator side. Such an arrangement provides a simplified combined high-pressure and low-pressure pilot valve having a single freely floating ball valve element which may be seated on opposed valve seats.

In the accompanying drawings, forming a part of this specification and wherein like reference numerals are employed to designate like parts:

FIG. 3 is a sectional view taken generally along line 3—3 of FIG. 2 and illustrating means responsive to either a high fluid pressure or a low fluid pressure for blocking the flow of control to a valve actuator;

FIG. 4 is a sectional view taken generally along line 4—4 of FIG. 2 and showing the flow path of the control fluid through the pilot valve structure to the valve actuator;

FIG. 6 is an enlarged section similar to FIG. 4 but showing the ball valve element in position after actuation of either the low pressure fluid responsive means or the high pressure fluid responsive means and blocking the flow of control fluid through the pilot valve;

Figure 8:
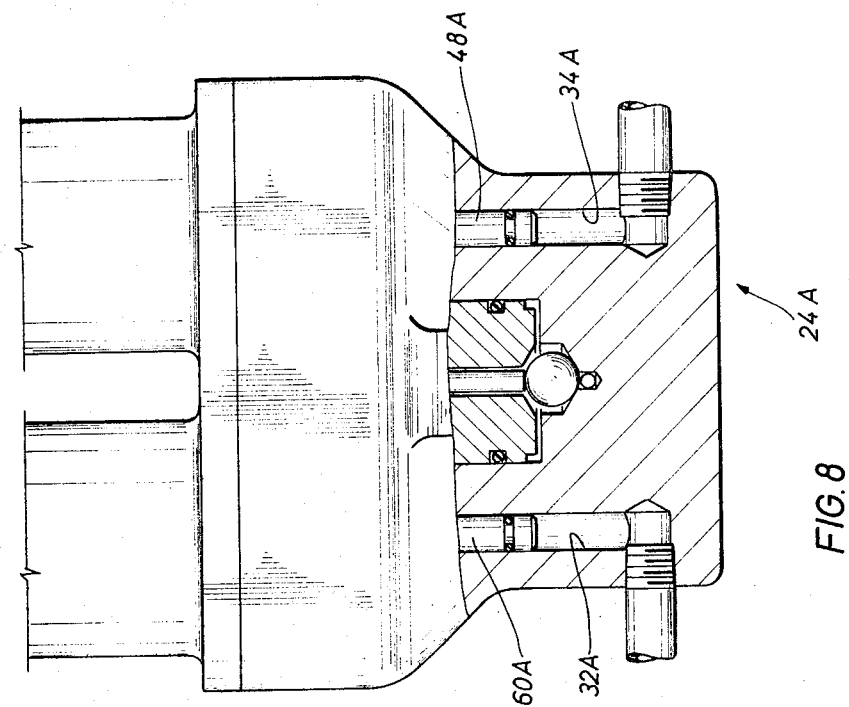
Figure 7:
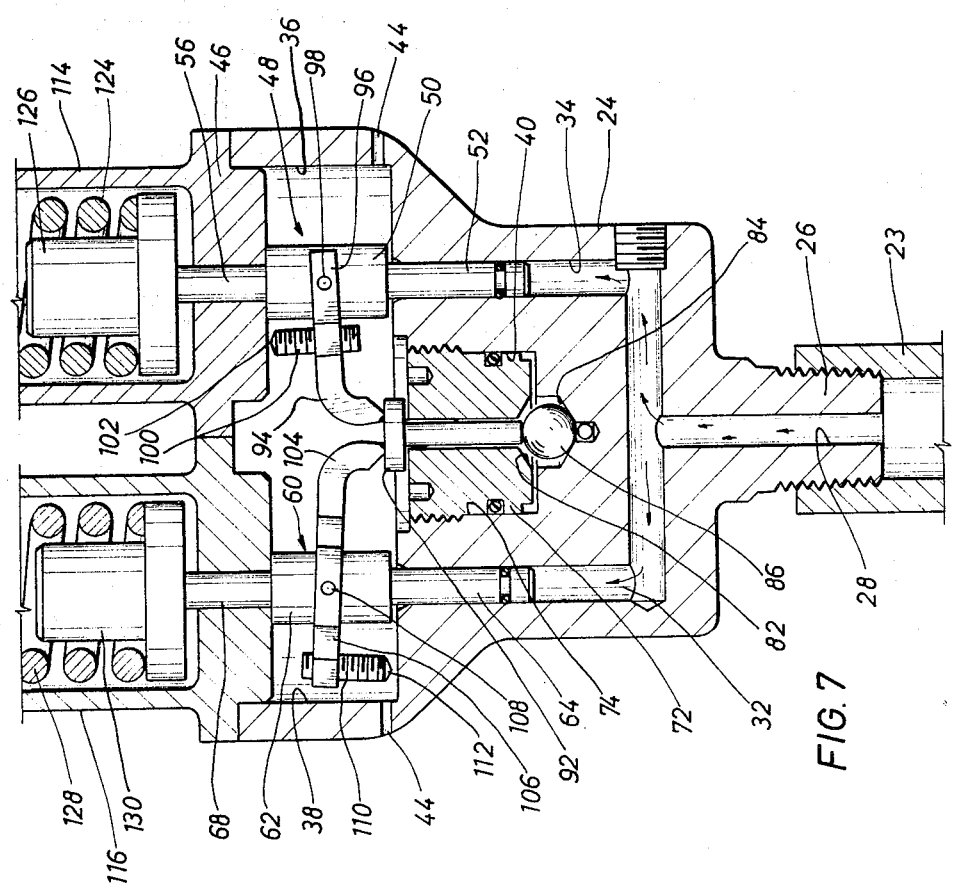

FIG. 7 is an enlarged section similar to the lower portion of FIG. 3 showing the ball valve element in a blocking position with respect to the control fluid after actuated by the high pressure fluid responsive means; and FIG. 8 is an enlarged section of a modified pilot valve structure in which separate inlet lines for the high pressure side and the low pressure side of the pilot valve structure are provided.

Figure 1:
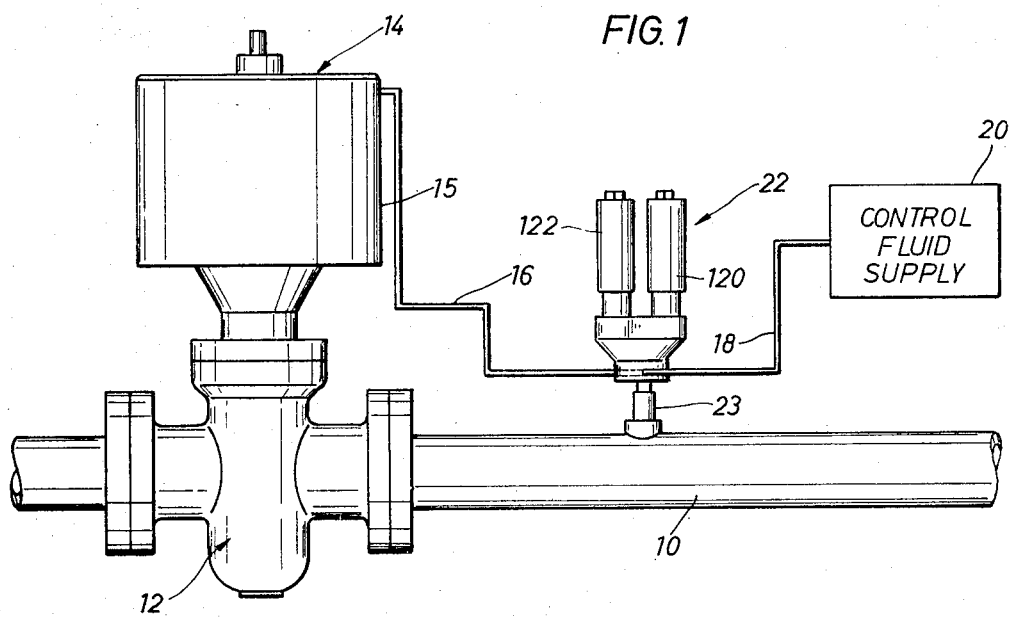
FIG. 1 is a schematic of the present invention showing the invention employed in a system for controlling the actuation of a valve member in a flowline.

Referring now to the drawings for a better understanding of this invention, and more particularly to FIG. 1, a flowline is indicated generally at 10 and has a control valve 12 therein which may be a conventional gate valve movable between open and closed positions. A pneumatic actuator generally indicated at 14 is provided to move control valve 12 between open and closed positions and is shown diagrammatically in FIG. 1 in open position. Pneumatic actuator 14 is of the piston operated type and remains in its up or open position of the gate valve so long as fluid is supplied to cylinder 15 by control flowlines 16 and 18 from a fluid supply 20. The pilot valve structure generally indicated 22 and comprising the present invention is connected between control flowlines 16 and 18 and is actuated either by a predetermined high pressure or a predetermined low pressure in flowline 10 sensed through branch line 23 to pilot valve structure 22 to block the flow of control fluid through line 16 to actuator 14. Upon the blocking of the flow of control fluid through line 16 to actuator 14, the fluid from cylinder 15 is exhausted to atmosphere from control line 16 as will be explained further below thereby permitting gate valve 12 to move to a closed position under the bias of a suitable spring or fluid force of actuator 14 to stop the flow of fluid through flowline 10.

While pilot valve structure 22 has been illustrated as employed in combination with a pneumatic valve actuator, it is to be understood that the pilot valve structure may be employed with other control devices, if desired.

Pilot valve structure 22 includes a main body 24 having an inlet nipple 26 connected in threaded relation to branch line 23 and providing an inlet fluid passage 28 in fluid communication with flowline 10 through branch line 23. Inlet passage 28 leads to low pressure passage or conduit 32 and high pressure passage or conduit 34. Formed in body 24 are enlarged end bores 36 and 38 and a central bore 40 formed between end bores 36 and 38 and being of a depth greater than end bores 36 and 38 as shown in FIG. 3. End bores 36 and 38 form piston actuating chambers and central bore 40 forms a valve chamber 42 of a reduced diameter at the bottom thereof.

Exhaust ports 44 extend through the wall of body 24 to atmosphere and may exhaust the control fluid to atmosphere from line 16 as will be explained later. An end plate 46 is secured, such as by welding, to an end of body 24 and provides a cover for bores 36, 38, 40 and 42. A high pressure piston generally indicated 48 has a body 50, a reduced diameter end 52 slidably fitting within conduit 34, and an opposed reduced diameter end 54 slidably fitting within an opening 56 extending through end plate 46. A seal 58 extends about reduced diameter end 52. A low pressure piston generally indicated 60 includes a main body 62, a reduced diameter end 64 slidably fitting within conduit 32 and having a seal 66 thereabout, and an opposed reduced diameter end 68 slidably fitting within opening 70 extending through end plate 46.

Mounted within central bore 40 is a valve seat body 72 having external screw threads 74 in threaded engagement with internal screw threads 76 adjacent the upper circumferential wall surface of bore 40. A seal 78 provides sealing engagement between valve seat body 72 and the adjacent wall surface of bore 40. Valve seat body 72 has a central aperture 80 extending therethrough which terminates at one end thereof in a valve seat 82. An opposed valve seat 84 is arranged adjacent the bottom of the reduced diameter valve chamber 42. A freely floating ball valve element 86 is mounted in valve chamber 42 and is seated on valve seat 82 when valve structure 22 is within the operating pressure range. A plunger generally indicated 88 has a stem 90 fitting within aperture 80 and in engagement with ball valve element 86. An enlarged upper head 92 of plunger 88 is positioned adjacent an upper end of valve seat body 72.

Mounted in engagement with enlarged head 92 is a high pressure actuating arm 94 having a bifurcated end 96 pivotally mounted by pin 98 to piston body 50. An adjusting screw 100 has an end 102 engaging the adjacent surface of end plate 46 and acting as a pivot for arm 94 inwardly of piston 48. Low pressure arm 104 has a bifurcated end 106 which is pivotally connected at 108 to body 62 of piston 60. An adjusting screw 110 has an end 112 abutting the adjacent surface of end bore 38 and acting as a pivot for arm 104 outwardly of piston 60.

End plate 46 has a pair of tubular extensions 114 and 116 extending therefrom with external screw threads 118 thereon. Spring housings 120 and 122 have internal screw threads in threaded engagement with external screw threads 118 on tubular extensions 114 and 116. A high pressure spring 124 is mounted within housing 120 and fits about a follower 126 which is secured to reduced diameter end 54 of high pressure piston 48. Spring 124 bottoms against the end of spring housing 120. Low pressure spring 128 fits about follower 130 secured to reduced diameter end 68 of low pressure piston 60. In normal operation within the desired pressure range with the supply of control fluid being maintained to actuator 14, piston 48 is in engagement with the bottom of end bore 36 and low pressure piston 60 is in engagement with the adjacent surface of end plate 46 as shown in FIG. 3.

Figure 2:
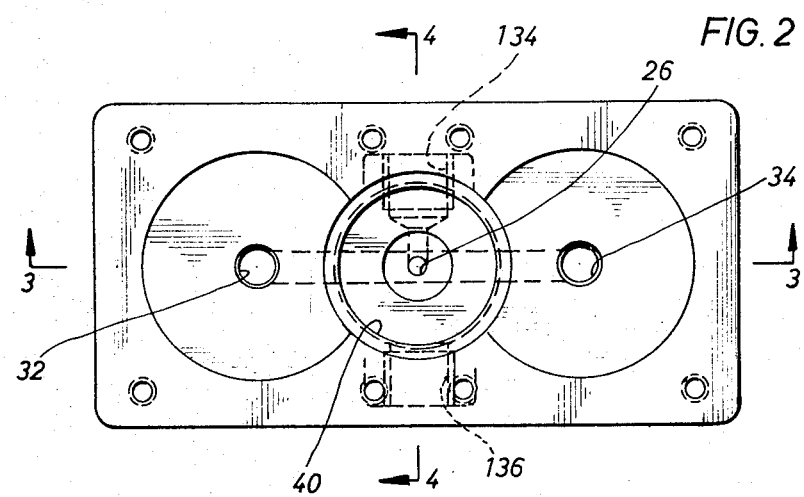
FIG. 2 is an enlarged top plan of the high-low pressure responsive pilot valve structure shown in FIG. 1 and forming the present invention.
Figure 5:
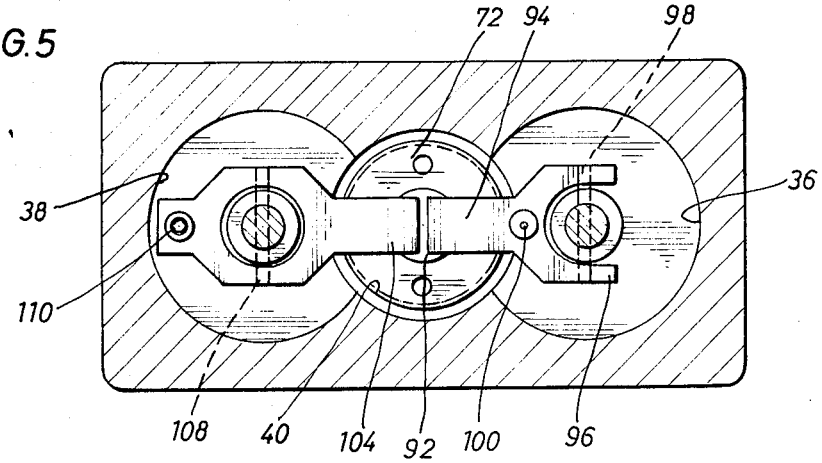
FIG. 5 is a section taken generally along line 5—5 of FIG. 3 and illustrating actuating arms for effecting movement of the ball valve element upon actuation of either the low pressure fluid responsive means or the high pressure fluid responsive means.

Referring particularly to FIGS. 2, 4 and 6, the flow path of control fluid through pilot valve structure 22 to actuator 14 is illustrated. Inlet conduit 134 receives control fluid from flowline 18 and outlet conduit 136 leads from valve chamber 42 to flowline 16 to valve operator or actuator 14. Under normal operation with the fluid pressure in flowline 10 within the operating pressure range, control fluid will flow from fluid supply 20 through inlet 134 to maintain valve element 86 in engagement with seat 82, and thence through chamber 42 and outlet conduit 136 to valve actuator 14. When ball valve element 86 is seated on seat 84, the flow of control fluid from inlet 134 to outlet 136 is blocked and control fluid from actuator 14 may be exhausted or bled to atmosphere through ports 44 as will be explained.

It is desirable to have the movement of freely floating ball valve element 86 between seats 82 and 84 at a minimum and a travel or clearance C as shown in FIG. 4 of around 0.010 inch has been found to function effectively. A minimum travel of valve element 86 will tend to limit the range of pressures between the bleed and reset positions for both the low pressure responsive means and the high pressure responsive means, and a minimum range is normally desirable. A travel C of valve element 86 of between around 0.002 inch and 0.050 inch has been found to be satisfactory dependent on the pressure differential between the bleed and reset positions of the high pressure responsive means and the low pressure responsive means.

The travel C of valve element 86 is proportional to the movement of high pressure piston 48 and low pressure piston 60 which abut an adjacent surface upon actuation. To insure that valve element 86 is fully seated on seat 84 upon actuation of either the high pressure responsive means or the low pressure responsive means, plunger 90 is moved a distance slightly greater than travel C by either arm 94 or arm 104. Valve element 86 is formed of a resilient or elastomeric material and the overtravel of plunger 90 may deform slightly valve element 86 after valve element 86 has been fully seated on seat 84.

Referring to FIG. 8, a separate embodiment of the invention is disclosed in which the high pressure piston may be exposed or in communication with a flowline pressure different from that of the low pressure piston. Pilot valve body 24A has a separate inlet 34A leading to high pressure cylinder 48A. A separate inlet 32A leads to low pressure piston 60A. Therefore, if desired, two separate flowlines may be sensed by the embodiment shown in FIG. 8 as oftentimes it may be desirable to have one flowline sensed only by high pressure responsive means and a separate flowline sensed only by low pressure responsive means.

OPERATION

Referring particularly to FIGS. 3 and 4 in which pilot valve structure 22 comprising the present invention is illustrated as operating within the desired pressure range, high pressure piston 48 is in engagement with the bottom of end bore 36 and low pressure piston 60 is in engagement with the adjacent surface of end plate 46. In this position valve ball element 86 remains in seated position on seat 82 with control fluid flowing through valve chamber 42 and outlet 136 to valve actuator 14, and gate valve 12 is maintained in an open position relative to flowline 10 by the control fluid pressure in actuator 14.

When the fluid pressure within flowline 10 reaches a predetermined high, reduced diameter end 53 of high pressure piston 48 is exposed to the fluid pressure in conduit 34 and moves to the position shown in FIG. 7 with piston 48 engaging the adjacent surface of end plate 46 against the bias of spring 124. Movement of piston 48 to the position of FIG. 7 pivots arm 94 about pivot 102 to move plunger 88 downwardly as viewed in FIG. 3 to seat ball valve element 86 on seat 84. Arm 104 pivots by gravity to the position shown in FIG. 7. In this position the flow of control fluid to actuator 14 is blocked by ball valve element 86 and the control fluid from actuator 14 is exhausted through center aperture 80 in valve seat body 72 and exhaust ports 44. Gate valve 12 then moves to a closed position relative to flowline 10 under the bias of spring or fluid force of actuator 14. Upon the flowline pressure dropping below the predetermined high, piston 48 resets under the bias of spring 124 and returns to its position of FIG. 3 engaging the bottom of end bore 36 with the control fluid reseating valve ball element 86 on valve seat 82 and again supplying control fluid to actuator 14.

Upon the pressure in flowline 10 reaching a predetermined low amount, piston 60 under the bias of spring 128 will move in engagement with the bottom of end bore 38 to pivot arm 104 about pivot 112 to a lower position as viewed in FIG. 3. In this position, plunger 88 is moved downwardly by arm 104 to unseat valve ball element 86 and reseat ball element 86 on seat 84 thereby to block the flow of control fluid to actuator 14. In this position, control fluid from actuator 14 is exhausted through center aperture 80 and exhaust ports 44 to atmosphere. Upon the pressure in flowline 10 exceeding the predetermined low pressure after the control fluid has been exhausted, piston 60 will return under the urging of the fluid pressure in line 32 to the position shown in FIG. 3 against the bias of spring 128 and permit ball valve element 86 to reseat or return to seat 82. The resupply of control fluid to actuator 14 results in reopening of gate valve 12.

What is claimed is:

1. A pilot valve structure comprising a valve body having a valve chamber therein and control fluid inlet and outlet means in fluid communication with the valve chamber, a valve element in said valve chamber movable therein between two seated positions and pressurized control fluid from said inlet means urging said valve element to one of said seated positions permitting the flow of control fluid through the valve chamber to the control fluid outlet means, said valve body having at least one pressure-sensing inlet, separate low pressure and high pressure responsive means in fluid communication with said pressure-sensing inlet and in engagement with the valve element to move the valve element to the other of said seated position when a pressure is reached outside the operating pressure range, said valve element when in the other of said seated positions blocking the flow of pressurized control fluid to the control fluid outlet means, said valve element returning under influence of the pressurized control fluid to said one of its seated positions upon the return of the fluid pressure being sensed to the operating pressure range, thereby to permit the flow of control fluid to the control fluid outlet means from the fluid inlet means.

2. A pilot valve structure as set forth in claim 1 wherein said valve element is a freely floating ball valve element and is movable between two opposed seated positions.

3. A pilot valve structure as set forth in claim 1 wherein said separate low pressure responsive means comprises a movable piston in fluid communication with the pressure sensing inlet and a compression spring continuously urging the piston toward a position for moving the valve element to the other of said seated positions when the predetermined low pressure is reached.

4. A pilot valve structure as set forth in claim 1 wherein said separate high pressure responsive means comprises a movable piston in fluid communication with the pressure sensing inlet and a compression spring continuously urging the movable piston toward a position for moving the valve element to the other of said seated positions when the predetermined high pressure is reached.

5. A pilot valve structure as set forth in claim 1 wherein said valve body has two separate pressure-sensing inlets, one pressure-sensing inlet in fluid communication with the low pressure responsive means and the other pressure-sensing inlet in fluid communication with the high pressure responsive means.

6. A pilot valve structure comprising a valve body having a valve chamber therein and control fluid inlet and outlet means in fluid communication with the valve chamber, a freely floating spherical ball valve element in said valve chamber movable therein between two opposed seated positions and pressurized control fluid from said inlet means urging said valve element to one of said seated positions permitting the flow of control fluid from the inlet means through the valve chamber to the control fluid outlet means, said ball valve element when seated at the other of said seated positions blocking the flow of control fluid from the inlet means to the outlet means, said valve body having at least one pressure-sensing inlet, and separate low pressure and high pressure responsive means in fluid communication with said pressure-sensing inlet and operable to move the ball valve element to the other of said seated position when a pressure is reached which is outside the operating pressure range.

7. A pilot valve structure as set forth in claim 6 wherein said separate low pressure and high pressure responsive means each comprises a compression spring, a piston biased adjacent one end by the spring in one direction, and fluid passage means in fluid communication with the piston adjacent the other end thereof with the fluid pressure continuously urging the piston against the bias of the associated compression spring.

8. A pilot valve structure as set forth in claim 7 wherein the fluid pressure overcomes the bias of the associated compression spring for the low pressure piston within the operating pressure range, and the compression spring for the high pressure piston overcomes the influence of the fluid pressure for the high pressure piston within the operating pressure range.

9. A pilot valve structure comprising a valve body having a valve chamber with two valve seats therein, a valve element in said valve chamber movable between two valve seats and adapted to seat thereon in fluid sealing relation, said valve body having control fluid inlet means and outlet means in fluid communication with said valve chamber with pressurized control fluid being exposed to the valve element and biasing the valve element to a seated position on one of the valve seats and permitting the flow of control fluid to said outlet means, valve actuating means in engagement with the valve element to move when actuated the valve element from said one valve seat to the other valve seat, means responsive to a predetermined low pressure and separate means responsive to a predetermined high pressure for actuating the valve actuating means against the influence of the pressurized control fluid when the respective predetermined pressure is reached, said valve element upon seating on said other valve seat blocking the flow of control fluid from the inlet means to the outlet means and permitting control fluid from the outlet means to be exhausted.

10. A pilot valve structure as set forth in claim 9 wherein said valve actuating means includes a plunger engaging the valve element and holding the valve element on said other valve seat when the valve actuating means is actuated by the predetermined low pressure or the predetermined high pressure.

* * * * *